(12) United States Patent
Senner et al.

(10) Patent No.: US 7,987,455 B1
(45) Date of Patent: Jul. 26, 2011

(54) SYSTEM AND METHOD OF COMMAND PROCESSING

(75) Inventors: Joe Senner, Round Rock, TX (US); David Kulwin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 10/898,627

(22) Filed: Jul. 23, 2004

Related U.S. Application Data

(60) Provisional application No. 60/489,455, filed on Jul. 23, 2003, provisional application No. 60/503,993, filed on Sep. 18, 2003.

(51) Int. Cl.
*G06F 9/45* (2006.01)
*G06F 9/44* (2006.01)
*G06F 3/00* (2006.01)

(52) U.S. Cl. ............... 717/136; 717/121; 715/700
(58) Field of Classification Search ............ 717/169
See application file for complete search history.

(56) References Cited

U.S. PATENT DOCUMENTS

| | | | | |
|---|---|---|---|---|
| 5,953,514 A | * | 9/1999 | Gochee | 717/138 |
| 6,389,543 B1 | * | 5/2002 | Dawson et al. | 726/4 |
| 6,681,386 B1 | * | 1/2004 | Amin et al. | 717/136 |
| 6,748,436 B1 | * | 6/2004 | Anand et al. | 709/226 |
| 7,290,248 B2 | * | 10/2007 | Sengodan | 717/136 |
| 7,293,099 B1 | * | 11/2007 | Kalajan | 709/230 |
| 7,784,036 B2 | * | 8/2010 | Tjong et al. | 717/136 |
| 2001/0020274 A1 | * | 9/2001 | Shambroom | 713/201 |
| 2002/0083216 A1 | * | 6/2002 | Hickson et al. | 709/319 |
| 2002/0156922 A1 | * | 10/2002 | Chan et al. | 709/246 |
| 2003/0069955 A1 | * | 4/2003 | Gieseke et al. | 709/223 |
| 2004/0268321 A1 | * | 12/2004 | Kreiner et al. | 717/136 |
| 2005/0144594 A1 | * | 6/2005 | Yamazaki | 717/136 |
| 2005/0154984 A1 | * | 7/2005 | Maddocks et al. | 715/700 |

OTHER PUBLICATIONS

"Easy access to remote graphical UNIX applications for windows users", R. Repasky, Oct. 2004, pp. 357-359, <http://delivery.acm.org/10.1145/1030000/1027886/p357-repasky.pdf>.*

* cited by examiner

*Primary Examiner* — Thuy Dao
(74) *Attorney, Agent, or Firm* — Holland & Knight LLP; Brian J. Colandreo, Esq.; Jeffrey T. Placker

(57) ABSTRACT

One embodiment of the present invention can include a computer program product comprising one or more computer readable media storing a set of computer instructions that are executable by one or more computer processors, wherein the set of computer instructions comprise instructions executable to generate a command according to a generic command structure, forward the command to a remote computer, receive the command at the remote computer and translate the command to platform specific format.

16 Claims, 11 Drawing Sheets

FIGRUE 4

200 HELLO
cmd mkdir
dir /gorp
root /tmp
go
300 DATA
mkdir /tmp/gorp
.
608 ──▶ 250 RESULT 2
/tmp/gorp  exists and is not a directory ◀── 610
.
cmd mkdir
dir /foo
root /tmp
go
300 DATA
mkdir /tmp/foo
.
612 ──▶ 250 RESULT 0
/tmp/foo already exits ◀── 614 quit
210 Goodbye

FIGURE 6B

200 HELLO
cmd rmdir
dir /skippy
root /tmp
go
300 DATA
618 → rmdir /tmp/skippy
.
620 → 250 RESULT 0
/tmp/skippy removed
.
quit
210 Goodbye

FIGURE 6C

622 {
    200 HELLO
    cmd size
    dir /tmp
    go

624 → 250 RESULT 21559520 857
size of "/tmp" complete
.
quit
210 Goodbye

FIGURE 6D

```
                200 HELLO
                cmd exec
                username jsenner
                password xxx
                root /tmp
625 ─────→ env S:FOO: this is foo
       ┌──→ env A:PATH:$FOO
626 ──┘     tag .
            dir .
            exec ls-la
            go
               (preceeding blocks skipped)

┌  300 DATA
            │  SET:FOO=this is FOO
632 ───────┤
            │  300 DATA
            └  PATH=$PATH:/$FOO
628 ──→
            300 DATA s 59
630 ──→ drwxrwxr-x 13 jsenner jsenner 4096 Jan 28 10:18 foo
            .
        ┌─→ 250 RESULT 0
634 ──┘     end "ls –la"
            .
            210 Goodbye
```

FIGURE 6E

SYSTEM AND METHOD OF COMMAND PROCESSING

RELATED APPLICATIONS

This application claims priority under 35 U.S.C. §119(e) to Provisional Patent Application No. 60/489,455, filed Jul. 23, 2003, entitled "System and Method of Distributed Processing" by Senner et al., and Provisional Patent Application No. 60/503,993, filed Sep. 18, 2003, entitled "System and Method of Distributed Processing" by Senner et al., which are both hereby fully incorporated by reference herein.

TECHNICAL FIELD OF THE INVENTION

Embodiments of the present invention relate to the field of command processing. More particularly, embodiments of the present invention relate to distributed command processing.

BACKGROUND

Many entities employ computer networks to process and store data. As the size of a network increases, the heterogeneity of the network typically also increases. This heterogeneity can result from a lack of a unified network growth plan, the fact that only particular applications are available for particular platforms, budgetary constraints or other constraints. While the heterogeneity in a particular network may have arisen based on practical concerns, it can lead to difficulty implementing applications that require distributed processing and/or the distribution of commands to multiple platforms.

FIG. 1 illustrates an embodiment of a prior art network that employs a command server 100 connected to a Unix system 105 and a Windows system 110 (Windows is a trademark of Microsoft Corporation of Redmond, Wash.) via a communications network 115. Command server 100, Unix system 105 and Windows system 110 can each include processors, memories, network interfaces or other computer components known in the art. In order to issue a remote command to Unix system 105 and Windows system 110, the command server 100 is, in typical prior art systems, required to format the command separately for each of Unix system 105 and Windows system 110. Based on the command, Unix system 105 and Windows system 110 could perform a process and return results.

FIG. 2 illustrates a prior art software architecture for issuing and processing commands. Command server 100 can include a command issuing program 200 that can issue commands to Unix system 105 (e.g., command 202) and Windows system 110 (e.g., command 203). Each of command 202 and command 203 can include a command string and environmental or working variables that are specific to each system. Additionally command 202 and command 203 will be formatted in a manner that can be used by underlying Unix system 105 and Windows system 110. Because each command is going to a different platform, command 202 and command 203 can contain different command strings, working variables and/or formats.

At Unix system 105, an interface program 205, such as an Internet Daemon (e.g., inetd or xinetd) can spawn an instance of a system shell 210 (i.e., the outermost layer of a program such as an operating system). Typically, the system shell to be spawned is stored in a configuration file. System shell 210 acts as an interface to underlying processes (e.g., shell process 215) that execute the received command and can provide a user interface for the underlying program. After verifying that command 202 is a valid command, system shell 210 can pass the command to shell process 215 for execution. The results of the execution are then passed back to the command issuing program via system shell 210 and interface program 205.

Similarly, at Windows system 110, an interface program 220 can receive command 203 and spawn system shell 225. As would be understood by those of ordinary skill in the art, Windows based systems do not typically include an inetd type of network service. Therefore, custom inetd type services are typically provided. After verifying the command 203 is valid, system shell 225 can pass the command to shell process 230 for execution. The results of the execution are then passed back to the command issuing program 200 via system shell 210 and interface program 205.

The typical interaction in prior art systems occurs as follows: the command issuing program opens a TCP/IP socket to the computer system receiving a command, the inetd or other interface program spawns the appropriate shell, the command issuing program issues a platform specific command to be executed, the command issuing program reads the response data back from the shell process and closes the TCP/IP connection.

Prior art systems suffer several shortcomings. As an initial problem, access control is extremely limited. Typically access is controlled through a user account setting in an inetd configuration file. If a command is received from an account with access, the inetd file will spawn the shell. No password based authentication is required. Thus, a user using the correct account name can access a computer system's shell without requiring a password. The user can then issue commands to the shell for potentially malicious purposes.

As a second shortcoming, different platforms require different working variables. For example, Unix requires different working variables than Windows, and some Unix shells require different working variables than other Unix shells. Dynamic construction of the working environment at a particular computer system must typically be supplied as part of the executed command. If the same command is provided to different platforms, the command will have to be constructed separately to account for differences in working variables used by each platform. For example, command issuing program 200 must create command 202 to include working variables that can be used by shell 210 and create command 203 to include working variables that can be used by shell 225. Since shell 210 and shell 225 operate on different platforms (e.g., Unix versus Windows) the construction of each command may be significantly different. This leads to a high level of complexity in the construction of commands and corresponding complexity in the programming of command issuing program 200.

Moreover, in prior art systems, the shell will typically have a default directory in which a command runs. To change the initial working directory, the initial working directory must be specified in the command. Because each platform uses different directory structures, a command will have to include the initial working directory in a format understandable by the specific platform to which the command is directed.

Prior art systems suffer several additional shortcomings. For example, process exit status (e.g., whether an underlying shell process has completed execution of a command) is not typically available to the command issuing program. Additionally, error reporting is inconsistent across platforms and may not be provided by some platforms. As yet another disadvantage, the data returned by most shells is raw command output. Therefore, the command issuing program must be able to interpret the data based on the commands issued and the platforms responding.

SUMMARY OF THE INVENTION

Embodiments of the present invention provide a system and method of command processing that eliminates, or at least substantially reduces, the shortcomings of prior art command processing systems and methods.

One embodiment of the present invention can include a computer program product comprising one or more computer readable media storing a set of computer instructions that are executable by one or more computer processors, wherein the set of computer instructions comprise instructions executable to generate a command according to a generic command structure and translate the command to platform specific format.

Another embodiment of the present invention can include a system for command processing comprising a command issuing computer that can include a command issuing computer processor, a command issuing computer readable medium, and a command issuing program. The command issuing program can be executable to generate a command and transmit the command to command processing computers according to a generic command structure. This embodiment of the present invention can also include a first command processing computer connected to the command issuing computer that can comprise a first command processing computer processor, a first command processing computer readable medium and a first command agent stored on the first command processing computer readable medium. The first command agent can be executable to receive the command according to the generic command structure and generate a first platform specific command based on the received command. The system can also include a second command processing computer connected to the command issuing computer comprising a second command processing computer processor, a second command processing computer readable medium and a second command agent stored on the second command processing computer readable medium. The second command agent is executable to receive the command according to the generic command structure and generate a second platform specific command based on the received command.

Yet another embodiment of the present invention can include a method of command processing comprising generating a command according to a generic command structure and translating the command into a platform specific command.

Embodiments of the present invention provide an advantage over prior art systems and methods of distributed command processing by allowing a command issuing program to issue the same command, using the same format, to various platforms.

Embodiments of the present invention provide another advantage over prior art systems and methods of distributed processing by providing for authentication before a command is passed to a shell.

Embodiments of the present invention provide yet another advantage over prior art systems and method by allowing a user to specify a working directory and environmental variables across platforms.

Embodiments of the present invention provide yet another advantage over prior art systems and methods by providing consistently formatted result data and status codes and well defined error messages.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIGS. 6A-6F are pseudo-code representations of sessions between a command issuing program and a command agent.

DETAILED DESCRIPTION

Embodiments of the present invention provide a system and method in which generic commands can be issued by a command issuing program and can be interpreted at the computer receiving the command. A command agent can receive and translate the generic command to a format usable by the underlying shell and can return data in a format understandable by the command issuing program. Additionally, the command agent can implement password or other variable based authentication to prevent unauthorized users from accessing the underlying shell.

Figure 1:
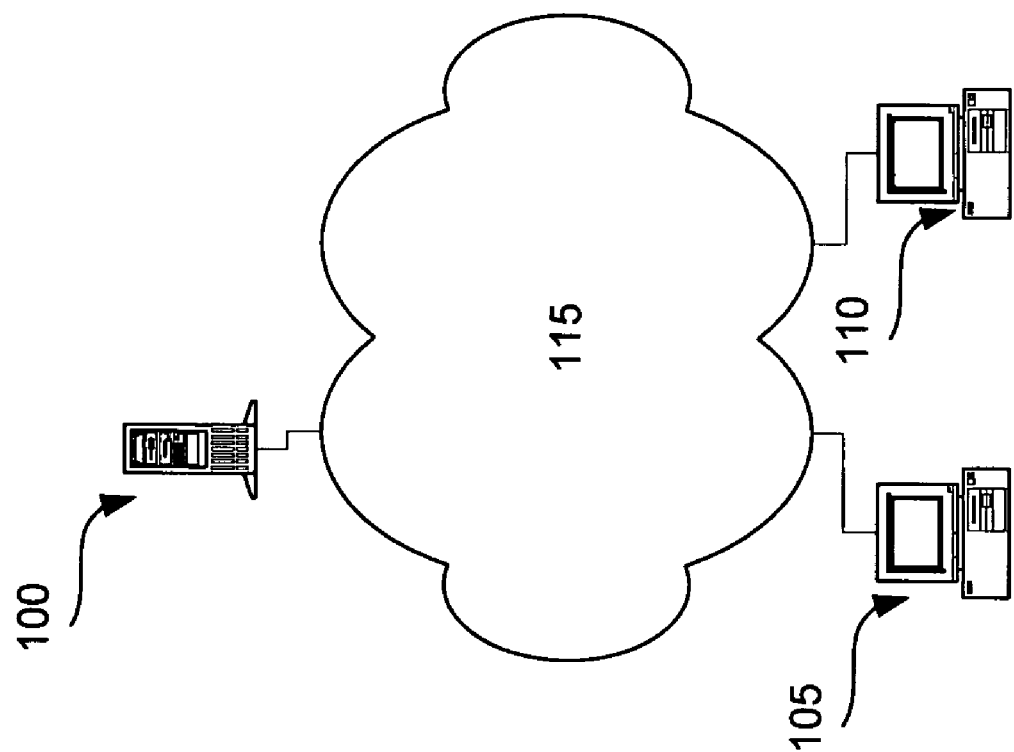
FIG. 1 is a diagrammatic representation of one embodiment of a prior art system for distributed command processing.
Figure 2:
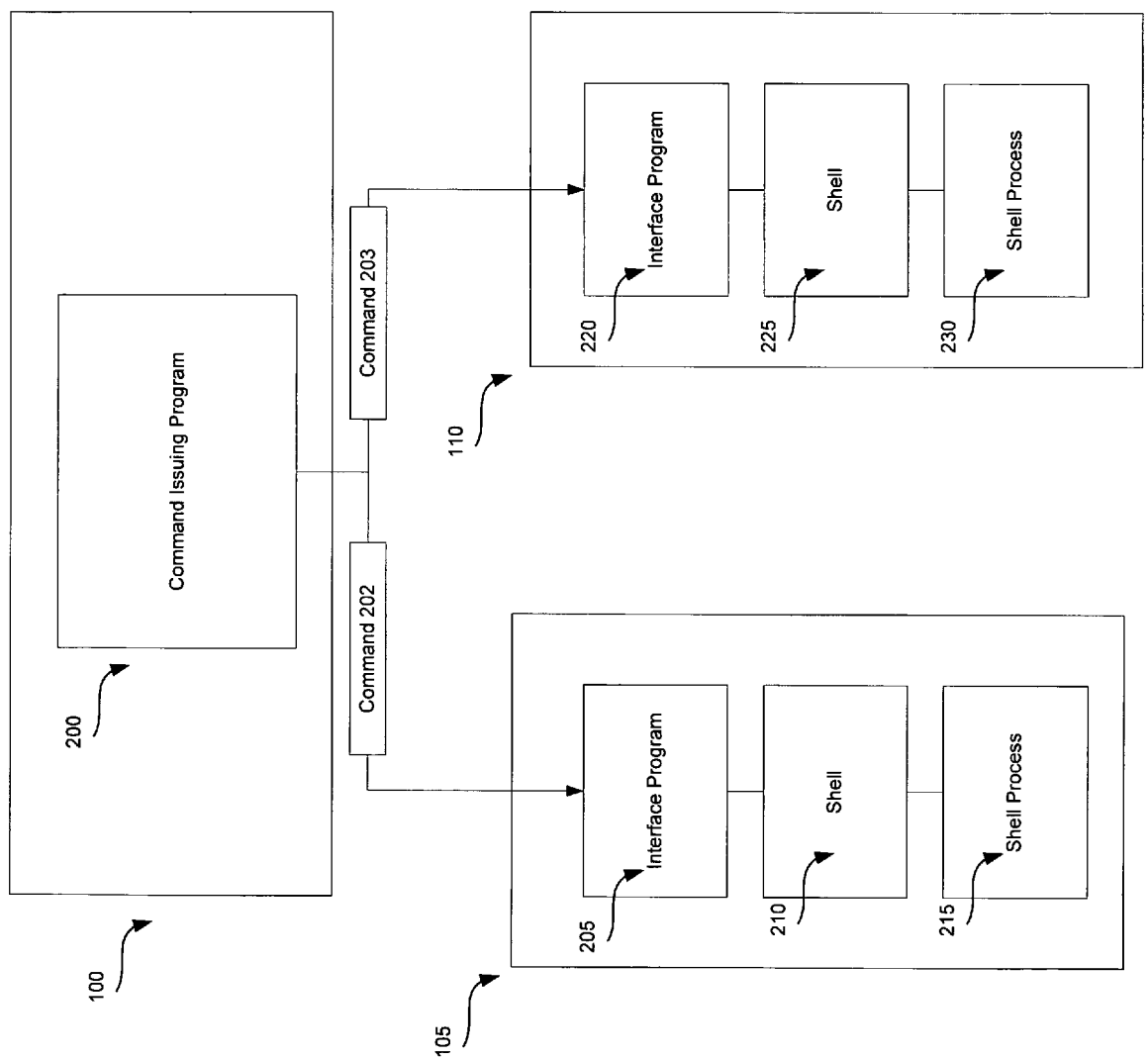
FIG. 2 is a diagrammatic representation of one embodiment of a prior art architecture for distributed command processing.
Figure 3:
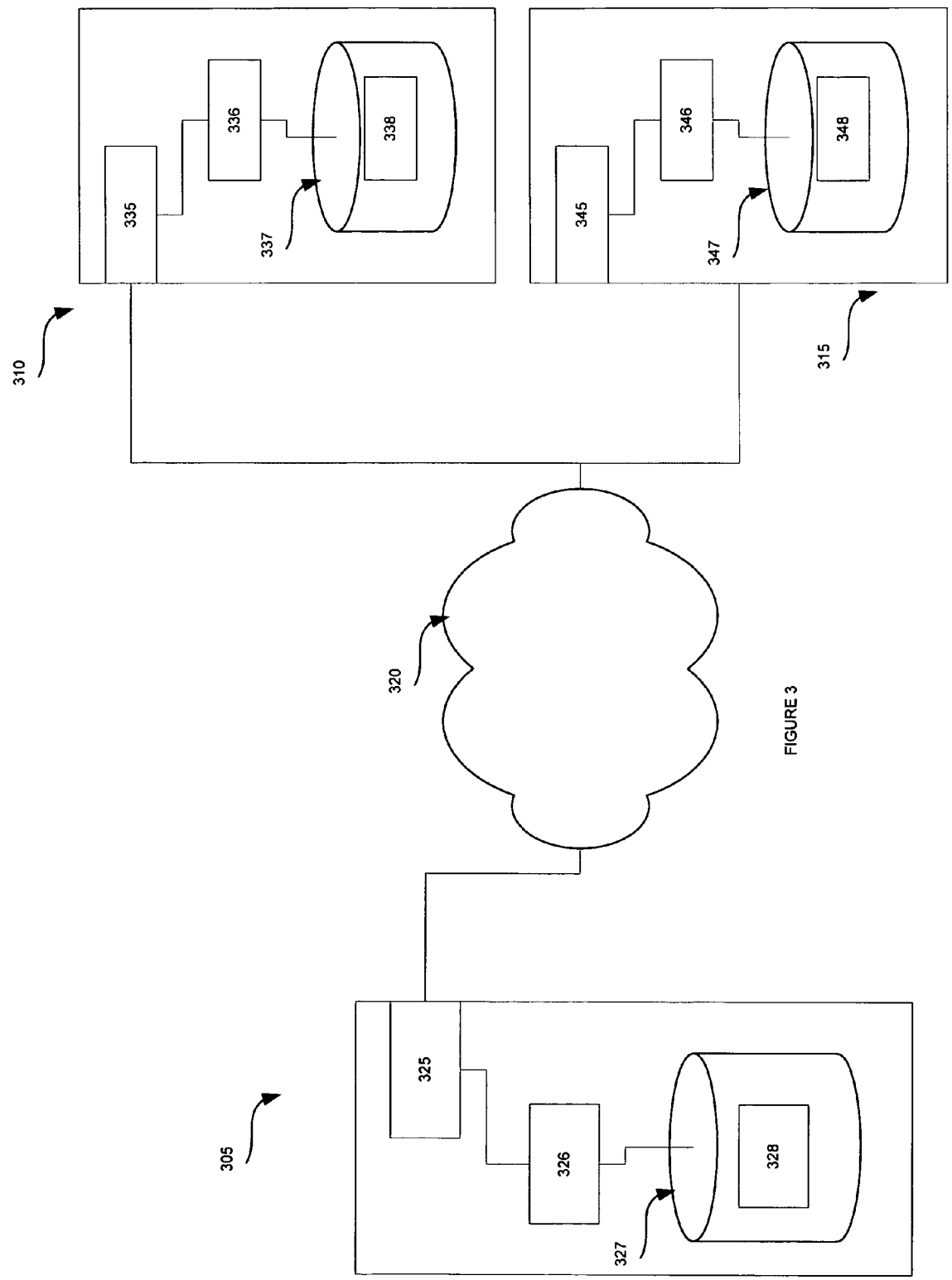
FIG. 3 is a diagrammatic representation of one embodiment of a system for command processing.

FIG. 3 is a diagrammatic representation of one embodiment of a system that can employ command agents to translate generic commands to platform specific commands. FIG. 3 illustrates a command issuing computer system 305 and two command processing computer systems 310 and 315 connected by a network 320, which can comprise any data communications network known in the art (e.g., Internet, WAN, LAN, Ethernet, wireless network). Command issuing computer system 305 can issue commands that can be processed by command processing computer systems 310 and 315 and command processing computer system 310 and 315 can return data to command issuing computer system 305. While only one command issuing computer system 305 and two command processing computer systems 310 and 315 are shown in FIG. 3, it should be understood that many more command issuing computer systems and command processing computer systems can be connected via network 320. Additionally, it should be noted that a particular computer system can be both a command issuing and command processing computer system.

Command issuing computer system 305 can include a network interface device 325 for connecting to and interfacing with network 320, a computer processor 326 and a computer readable medium 327. Computer readable medium 327 can comprise any computer readable medium known in the art (e.g., magnetic storage medium, optical storage medium, RAM, ROM, Flash or other medium known in the art) and can include a set of computer instructions 328 (a "command issuing program") executable by processor 326 to issue commands to command processing computer systems 310 and 315. It should be noted that computer system 305 can include additional components and intervening logic that have been omitted for the sake of clarity.

Command processing computer system 310 can include a network interface device 335 for connecting to and interfacing with network 320, a computer processor 336 and a computer readable medium 337. Computer readable medium 337 can comprise any computer readable medium known in the art (e.g., magnetic storage medium, optical storage medium, RAM, ROM, Flash or other medium known in the art) and can include a set of computer instructions 338 (a "command agent") executable by processor 336 to process commands received from command issuing computer system 305. It should be noted that computer system 310 can include additional components and intervening logic that have been omitted for the sake of clarity.

Similarly, command processing computer system 315 can include a network interface device 345 for connecting to and interfacing with network 320, a computer processor 346 and a computer readable medium 347. Computer readable medium 347 can comprise any computer readable medium known in the art (e.g., magnetic storage medium, optical storage medium, RAM, ROM, Flash or other medium known in the art) and can include a set of computer instructions 348 (a "command agent") executable by processor 346 to process commands received from command issuing computer system 305. It should be noted that computer system 315 can include additional components and intervening logic that have been omitted for the sake of clarity.

In operation, computer instructions 328 can be executable by processor 326 to issue a command using a generic command structure to processing systems 310 and 315. At command processing systems 310 and 315, computer instructions 338 and 348 can be executed by processors 336 and 346, respectively, to receive the command, spawn (i.e., launch) a command agent and translate the command to format usable by the respective command processing computer system. Thus, for example, if command processing computer system 310 is a Unix based system, the command agent can translate the command into a format usable by the Unix shell and if processing computer system 315 is a Windows based system, the command agent can translate the generic command to a format usable by the Windows shell. Computer instructions 338 and 348 can also be executable to execute the received command and return data to command issuing computer system 305 in a format usable by command issuing computer system 305.

It should be noted that the embodiment of FIG. 3 is provided by way of example only and each of the sets of computer instructions can be implemented on one or more computer readable media and can be executable by one or more processors. Additionally, the instructions can take the form of hardware, software and/or firmware and can be distributed.

Figure 4:
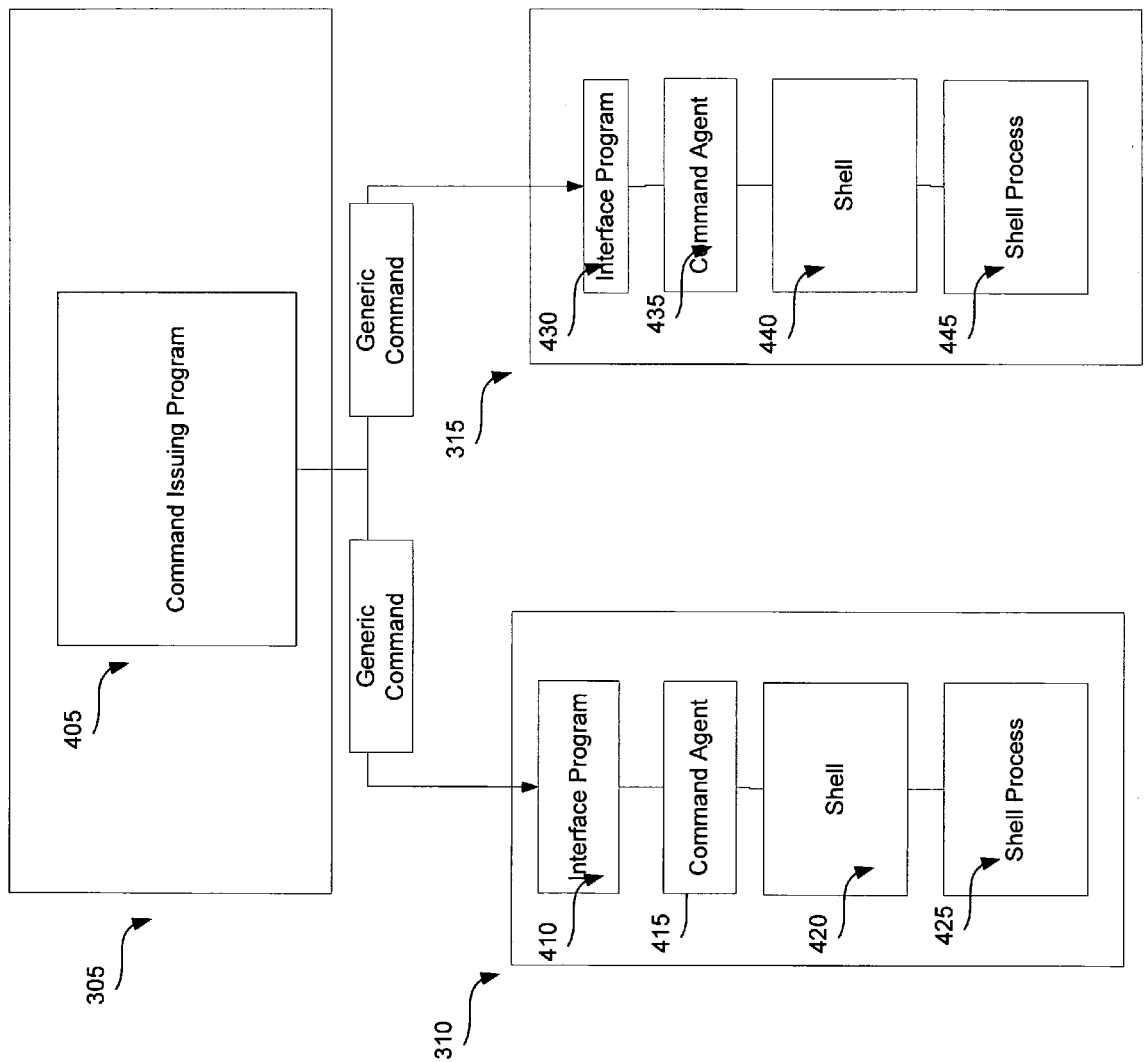
FIG. 4 is a diagrammatic representation of one embodiment of a software architecture for command processing.

FIG. 4 is a diagrammatic representation of one embodiment of a software architecture for processing generic commands. Command issuing computer system 305 can include a command issuing program 405 that can issue commands to Unix system 310 and Windows system 315. It should be noted that the Unix and Windows platforms are used by way of example only, and that any computer platform can be used including various varieties of Unix systems that use different commands.

In one embodiment of the present invention, command issuing program 405 can issue a command and format the command according to a generic command structure. Thus, the same generic command can be issued to Unix system 310 and Windows system 315 without specifically tailoring the command for each system. One embodiment of the generic command structure can be a command block including all or a portion of the following information: a header, a command string, working directory specification, one or more environment settings (i.e., working variables), authentication information and a footer. The command string can be a string of data representing the command to be executed. The environmental settings can specify a set of working variables that can be used by a shell to define particular settings at the shell. The authentication information can contain authentication data, such as account names, passwords, user names or other authentication data known in the art. The working directory specification can specify the working directory in which a shell is to begin execution. The header and footers can contain any user defined information. According to one embodiment of the present invention, the generic command structure can be formatted as a command block with tags and command parameters. The tag values indicate an action for the command agents, discussed below, to take and the parameter value(s) associated with each tag indicate the data appropriate for the action.

According to one embodiment of the present invention, configuration file for interface program 410 (e.g., inetd or xinetd) at Unix system 310 can be configured such that interface program 410 launches an instance of command agent 415 rather than shell 420 when a connection is established. In essence, the command agent, rather than the system shell, can become the protocol interface. Command agent 415 can read the generic command structure and authenticate the command based on, for example, authentication libraries available on computer system 310. When the command has been authenticated, command agent 415 can translate the command string to a command understandable by system shell 420. Additionally, command agent 415 can translate the environmental setting blocks into variables that are understandable by system shell 420 and map the starting directory to a directory accessible by shell 420. Command agent 415 can pass the translated command, environmental settings and starting directory to system shell 420 that can in turn execute the command according to an underlying shell process 425. Shell process 425, upon execution of the command, can return raw response data and errors to command agent 415 through shell 420. Command agent 415 can format the raw response data in a generic response format that, in one embodiment of the present invention, can include a result block header, a data segment and a result block footer. Command agent 415 can return the generically formatted response data to command issuing program 405. Additionally, command agent 415 can format error responses in a generically formatted error message that can include, for example, a result block header, the error data and a result block footer. An analogous process can occur at Windows system 315. At windows system 315, an interface program 430 can establish a connection with command issuing computer system 305 and launch an instance of command agent 435. In one embodiment of the present invention, command agent 435 for the Windows based systems can include a "built-in" inetd network service process or other interface program alleviating the need to provide this functionality via third party applications. Command agent 435 can read the generic command and authenticate the generic command based on, for example, authentication libraries available on computer system 315. It should be noted that the authentication may occur according to a different process than authentication at Unix system 310. When the command has been authenticated, command agent 435 can translate the command string to a command understandable by system shell 440. Additionally, command agent 435 can translate the environmental setting blocks into variables that are understandable by system shell 440 and map the starting directory to a directory accessible by shell 440.

Because Windows system 315 and Unix system 310 use different commands and environmental settings, the commands and variables generated by command agent 415 and command agent 435 can be different, despite being generated based on the same generic command.

Command agent 435 can pass the translated command, environmental settings and starting directory to system shell 440 that can in turn execute the command according to an underlying shell process 445. Shell process 445, upon execution of the command, can return raw response data and errors to command agent 435 through shell 440. Command agent 435 can format the raw response data in a generic response format that, in one embodiment of the present invention, can include a result block header, a data segment and a result block footer. Command agent 435 can return the generically formatted response data to command issuing program 405. Additionally, command agent 415 can format error responses in a generic error message that can include, for example, a result block header, the error data and a result block footer.

Figure 5:
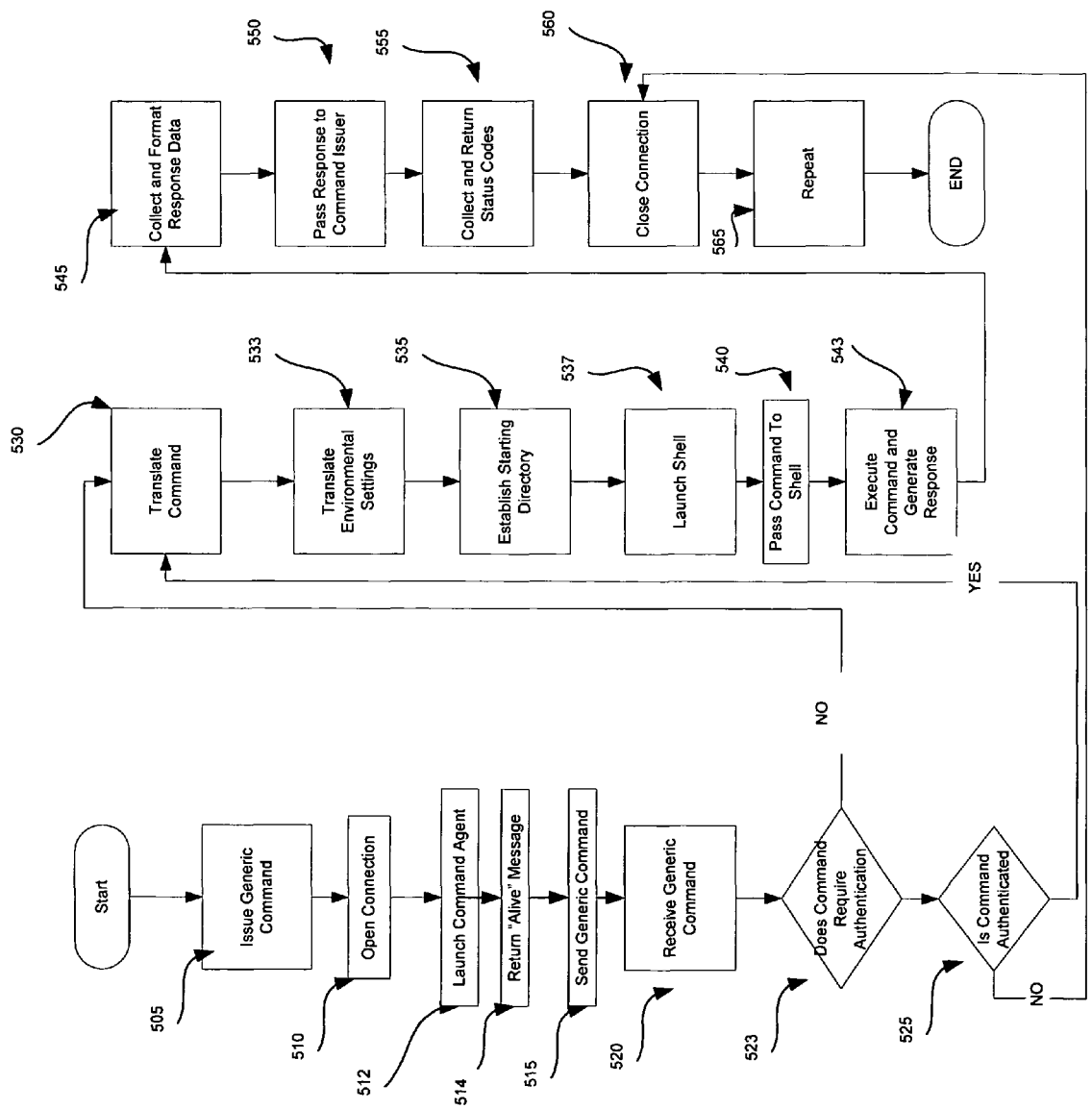
FIG. 5 is a flow chart illustrating one embodiment of method for command processing.

FIG. 5 is a flow chart of one embodiment of a method for processing generic commands. The method of FIG. 5 can be implemented as computer instructions (e.g., software, firmware and/or hardware) stored on one or more computer readable mediums that are executable by one or more processors. At step 505 a program can generate a command formatted in a generic command structure (i.e., can generate a generic command). The generic command can be transmitted to one or more command processing computer systems via a network. At step 510, the command issuing program can establish a connection, such as an IP/TCP connection, with an interface program (e.g., inetd, xinetd) and the interface program can spawn and instance of a command agent (step 512). The command agent, at step 514, can respond with an alive message that can include, for example, the version of the command agent. For instance, the client agent can respond with "200 HELLO BuildForge Client Version 1.0." or simply with "200 HELLO" or with any other predetermined information to indicate that the connection was successful. The command agent can then wait for request inputs.

At step 515, the command issuing program can transmit the generic command over the established connection and, at step 520, the command agent can receive the generic command. The command can take the form, for example, of:

cmd param
cmd param
cmd param
.
.
.
go

As discussed above, the generic command can also include authentication information. The command agent can, at step 523, determine whether the command needs to be authenticated and, if so, determine, at step 525, whether the command is authenticated based on the authentication information in the command. Authentication can take place according to any authentication method known in the art. For example, the command agent can pass authentication data to system authentication libraries and set process level authentication tokens/privileges. If the command is not authenticated at step 525, control can pass to step 560. if the command is authenticated at step 525, or did not require authentication, as determined at step 523, control can pass to step 530.

The command agent, at step 530, can translate the command string from the generic format to a format usable by the underlying shell. For example, the command agent can translate the command from a predefined format to the format used by the Unix CShell or Bourne Shell. It should be noted that the command agent can be configured to translate the command from any predefined format into any platform specific format known in the art. Additionally at steps 533 and step 535, the command agent can translate any working environment settings into variable usable by the underlying shell and map the starting directory to directory usable by the underlying shell.

At step 537, the command agent can launch an underlying shell and, at step 540, pass the command, along with any environmental settings and a starting directory, to the shell. A shell process can execute the command at step 543 and generate a response. The command agent, at step 545, can read the response and format the response according to a generic response format.

Generally, a shell process will generate a response as a series of data lines. In one embodiment of the present invention, the command agent can format each line into one or more data blocks and a result block that includes a header, a line of response data and a footer. For example, a command agent can respond to a generic command with a data block and a result block as follows:

300 DATA <attributes>
<data>
<data>
.
.
.
250 RESULT <attributes>
<data>
[<data>]
.
.
.

Additionally, the command agent can format error messages into one or more error response blocks that similarly include a header, error data and footer. At step 550, the command agent can pass the result blocks, data blocks and error blocks to the command issuing program. It should be noted that, in one embodiment of the present invention, the result blocks, data blocks and error data blocks can have essentially the same format. In such a case, the header for each type of block can define the type of content and length of content in the block. This can allow the command issuing program to identify error messages and response data. Additionally, delineating the response data into multiple result and data blocks can alleviate the burden of the command issuing program delineating the raw response data.

At step 555, the command agent can collect process status flags and return status codes to the command issuing program. In one embodiment of the present invention, the command agent can translate the protocol specific status messages to standardized status codes prior to sending the status codes to the command issuing program. At step 560, communication can be terminated by, for example, the command issuing program sending a QUIT command or by simply closing the connection. In one embodiment of the present invention, this can occur after a status code is received by the command issuing program indicating that the shell process has completed execution of the command. At step 565, the process can be repeated.

The order of steps presented in FIG. 5 is provided by way example and, as would be understood by those of ordinary skill in the art, various steps can be rearranged and/or omitted. For example, steps 530, 533 and 535 can occur before steps 523 and 525. Additionally, it should be noted that the command, data, result and error structures and commands (i.e., go, quit, and other commands) described above are provided by way of example and not limitation.

The command agents can include programming to convert various commands formatted according to the generic command structure into platform specific commands. By way of example, but not limitation, such commands include make directory ("mkdir"), remove directory ("rmdir"), directory size ("size"), execute ("exec"), environmental commands ("env"), read commands and write commands. Table 1 provides an example of tags and parameters for a command block for the make directory command:

TABLE 1

| tag | parameter/value |
|---|---|
| cmd | mkdir |
| dir | fully qualified path name |
| root | fully qualified path name |
| username | username |
| password | password |
| go | |

According to table 1, the mkdir command block can have a cmd parameter indicating that the command agent should format a make directory command for the underlying platform (e.g., UNIX, Windows or other platform). The mkdir command block can further include the directory to be created and the root directory. Additionally, the mkdir command block can include authentication information, such as a username and password, and an indication that the command block is finished, in this case the "go" tag. The command agent, in response to the mkdir command can format a command for the underlying platform to create a directory at the specified pathname and can return the result (e.g., the exit status) of the process.

Figure 6A:
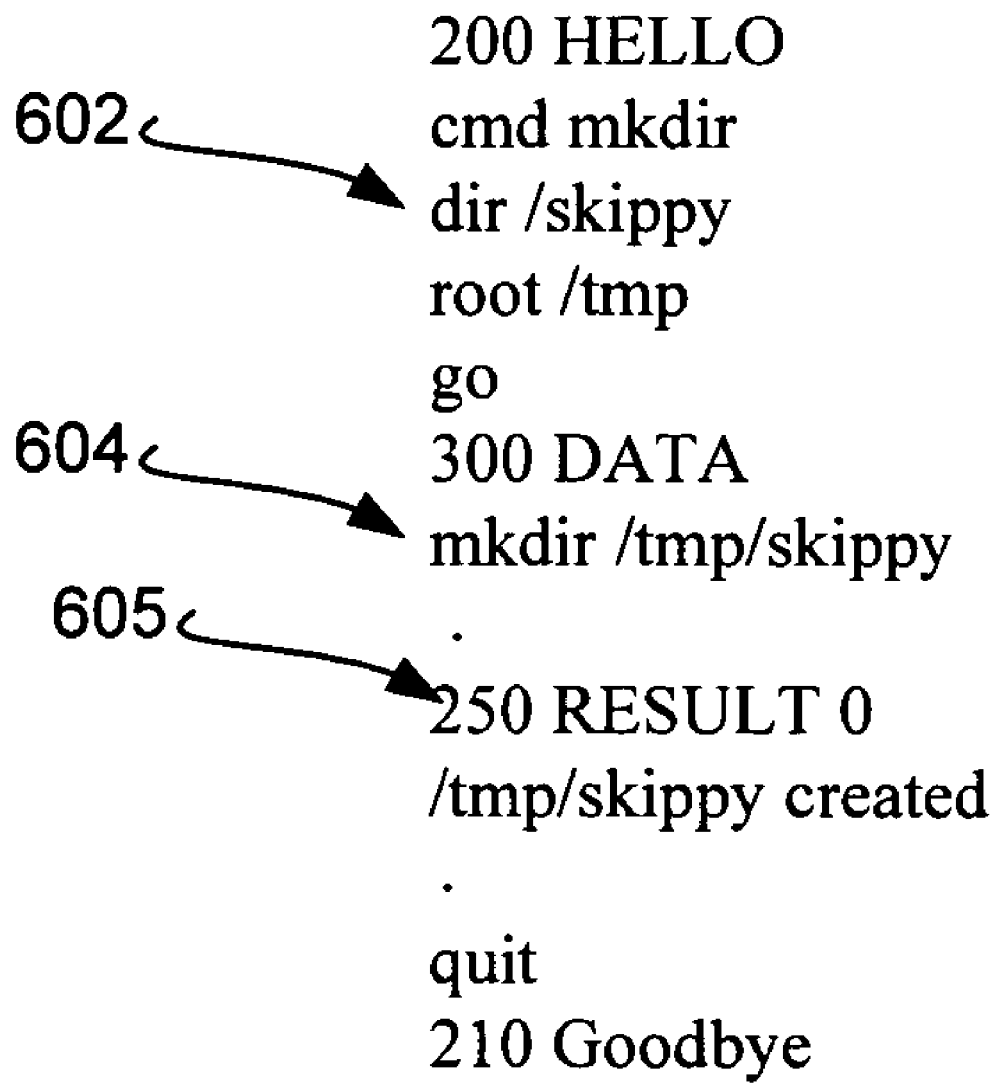

FIGS. 6A provide example pseudo-code of a session between a command issuing program and command agent for a mkdir command. In the example of the FIG. 6A, the command agent is requesting that the command agent issue a command to the underlying platform to make a directory named "skippy" (line 602) in root directory "tmp". The command agent can translate the command into a format understandable by the underlying platform, such as by inserting by issuing a "mkdir c://tmp/skippy" command to a windows platform or "mkdir /tmp/skippy" to a Unix based system. It should be noted that the command agent can also format a command to an underlying platform to, for example, insert intermediate directors. If, for example, the "tmp" root did not exist in the above example, the command agent could issue a "mkdir -p /tmp/skippy" command to the underlying platform. The command agent can return the command issued to the underlying platform (line 604) and whether or not the command was successful. In this case RESULT 0 in line 605 indicates that the command was successful.

According to one embodiment of the present invention, attempting to make a directory that already exists is not an error. FIG. 6B illustrates an example of a session between a command issuing program and command agent for making a directory that already exists. As shown in lines 608 and 610, the mkdir command for /tmp/gorp failed, as indicated by RESULT 2, because /tmp/gorp exists but is not a directory. However, as shown in lines 612 and 614, the mkdir command for /tmp/foo does not result in an error (as indicated by RESULT 0 in line 612) because /tmp/foo already exists and is a directory. In other embodiments of the present invention, attempting to make a directory that already exists can result in an error.

Table 2 provides an example of tags and parameters for the remove directory command:

TABLE 2

| tag | parameter/value |
|---|---|
| cmd | rmdir |
| dir | fully qualified path name |
| root | fully qualified path name |
| username | username |
| password | password |
| go | |

According to Table 2, the rmdir command block can have a cmd parameter indicating that the command agent should format a remove directory command for the underlying platform (e.g., UNIX, Windows or other platform). The rmdir command block can further include the directory to be removed and the root directory. Additionally, the rmdir command block can include authentication information, such as a username and password, and an indication that the command block is finished, in this case the "go" tag. The command agent, in response to the rmdir command, can format a command for the underlying platform (i.e., a platform specific command) to delete the appropriate directory and can return the result (e.g., the exit status) of the process. FIG. 6C illustrates one embodiment of a session between a command issuing program and a command agent for a remove directory command. Again, the command agent can return an indication of the command issued to the underlying platform (line 618) and the result of the operation (line 620). In this example, the RESULT 0 in line 620 indicates that the process was successful. According to one embodiment of the present invention, attempting to remove a directory that is absent will not result in an error.

Table 3 provides examples of tags and parameters for a "size" command:

TABLE 3

| tag | parameter/value |
|---|---|
| cmd | size |
| dir | fully qualified path name |
| username | username |
| password | password |
| go | |

In this example, the command issuing program can format a command block including the "size" command and the fully qualified path name for which it wishes a size to be returned. The command agent can translate the size command according to the underlying platform to return, for example, the size of the specified directory and all sub directories and the number of files/directories/nodes within the specified directory or subdirectories. According to other embodiments of the present invention, the size command can be used to determine the size of specific files or objects specified. FIG. 6D illustrates an example of a session between a command issuing program and a command agent using the size command according to one embodiment of the present invention. In this example, the command issuing program issues a command to determine the size of the /tmp directory (section 622). The command agent can translate the command into the corresponding command for the underlying platform (e.g., the command agent can translate the size command to the "du -k" command in the \tmp directory for a UNIX platform). The command agent can return the size of the /tmp directory and number of the size of the specified directory and all sub directories and the number of files/directories/nodes within the specified directory or subdirectories (line 624). In this example, the command agent can return 21559250 kb and 857 files/directories/nodes in the /tmp directory.

Table 4 provides an example of tags and parameters that can be used for an "exec" command:

TABLE 4

| tag | parameter/value |
|---|---|
| cmd | exec |
| root | fully qualified base directory |
| tag | build tag string |
| dir | relative subdirectory for build step |
| exec | command to execute |
| env | action:variable:value |
| username | username |
| password | password |
| go | |

In this example, the command issuing program can specify that a command to be executed, the directory in which it is to be executed, a build tag string, a relative subdirectory for the build step, environmental commands and authentication information. The environmental commands can specify an action, a variable, and a value for the variable. An example of actions can include setting an environmental variable to a value (specified by "S" according to one embodiment), appending a value to the existing variable and creating the variable if needed (specified by "A" according to one embodiment), pre-pending the value to the existing variable and creating the variable if needed (specified by "P" according to one embodiment) and clearing the variable from the environment (specified by "C" according to one embodiment). Table 5 lists several example environmental commands and equivalent commands for a UNIX shell (e.g., CShell or Bourne Shell) It should be noted that environmental commands can be also be set in command blocks for other commands such as the mkdir and rmdir commands.

TABLE 5

| environmental command | shell equivalent |
|---|---|
| env S:CVSROOT:/src | CVSROOT = /src |
| env P:PATH:/usr/local/bin | PATH = /usr/local/bin:$PATH |
| env A:LD:/foo/lib | LD = $LD:/foo/lib |

FIG. 6E illustrates one embodiment of a session between a command issuing program and a command agent for a "exec" command. In this case, the base directory is set to /tmp, the environmental variable FOO is set to "this is foo" (line 625) and, the value of FOO ("this is foo") is appended to the value of PATH (line 626). Additionally, command issuing program specifies that the command agent should issue an ls-la command or platform specific equivalent to the underlying shell. As would be understood by those in the art, the "ls" command, in Unix, lists all files in the directory that match a specified name or all files if no name is specified. The "l" in "-la" specifies that files should be returned in a long form listing, and the "a" in "-la" specifies that all files should be displayed. The data block can specify that it is returning string data that is 59 bytes long (line 628). The data block also includes the file listing (the file listing, in this example, begins at line 630). The command agent can also return data blocks indicating that it has carried out the environmental commands (section 632). The command agent can also return an indication of whether the "ls-la" command has been executed successfully (indicated by RESULT 0 at line 634).

According to one embodiment of the present invention, the client agent can return data blocks in response to environmental commands after the "go" has been sent by the command issuing program. The command agent can queue the environmental commands when a complete command block has been received. Additionally, according to one embodiment of the present invention, the command agent can process the environmental commands before other commands (e.g., can process the "S:FOO:this is foo" and "A:PATH:$FOO" before processing the "ls-la" command in the above example). The command agent, according to one embodiment, can process the environmental commands in the order received. The data blocks returned in response to the execution of the environmental commands can be logged by the command issuing program to build a project log table for future reference. Command agents, according to one embodiment of the present invention, do not clear the operating environment established by previous environmental commands in a command block before processing subsequent environmental commands in the same command block.

Table 6 provides an example of tags and parameters that can be used for a "read" command.

TABLE 6

| tag | parameter/value |
|---|---|
| cmd | read |
| dir | fully qualified pathname |
| blocksize | specify size of data blocks in bytes |
| username | username |
| password | password |
| go | |

The data blocks returned by the command agent can specify various data attributes. Each file can, and typically is, broken up into blocks of stored data by the underlying platform. Each data block returned by the command agent can consist of a block of stored data from the file. The attributes of each data block returned by the command agent can specify an offset of where the particular block of stored data starts. The command issuing program can reassemble the file in the correct order based on the offset for each block of stored data. The data block returned by the command agent can specify the file type, byte offset into file where particular block of stored data starts, the octal mode bids for file and a pathname relative to the specified directory. The file types can include, by way of example, but not limitation, symlink, dir, file, pipe, chardev, blkdev. Additionally, the command agent can return the results of executing the command.

Figure 6F:
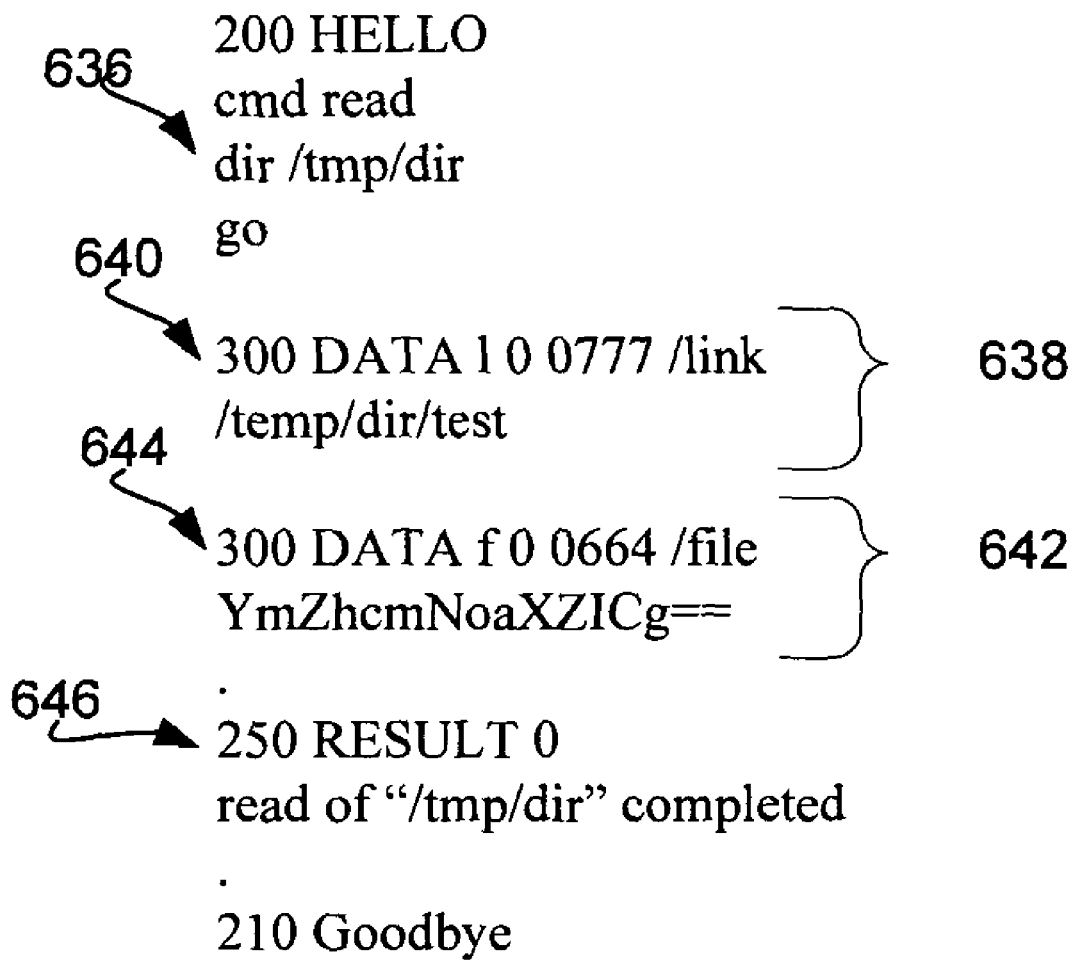

FIG. 6F illustrates one embodiment of session between a command issuing program and an agent for a read command. In this case, the command issuing program specifies that the command agent should issue a command to the underlying platform to read data in the directory "/tmp/dir" (line 636). No specific data block size is specified, so the command agent can use a default size. The command agent can receive the results of the read command from the underlying platform and form data block 638 indicating that the file type is symlink (indicated by the "1" in line 640) with a byte offset of zero (indicated by the "0" in line 640) an octal mode bits of 0777 and a relative pathname of "/link" (i.e., a fully qualified path of "/tmp/dir/test/link"). The command agent can also form data block 642 indicating that the file type is file (indicated by the "f" in line 644) with a byte offset of zero, octal mode bits of 0664 and a relative pathname of /file. Data block 642 can also include the data read from the file for that particular block of stored data. The command agent can return whether the read command was completed with or without error (line 646).

It should be noted that the command blocks, environmental commands and session examples provided in tables 1-6, FIGS. 6A-6F and described in the accompanying discussion are provided by way of example only and additional commands, such as the write command, can be issued. Embodiments of the present invention can use other generic command structures that can be translated into platform specific commands. Additionally, the command agents can return data and results in any suitable manner. In the above example, the command names in the generic command structure resembled those issued to underlying platforms. For example, both UNIX and Windows have a version of the mkdir command. However, the commands in the generic command structure can be arbitrarily named. The command agents can include programming to map the arbitrarily named commands to the platform specific commands.

As an example of formatting a command for different platforms, in this case UNIX and Windows, assume a command agent receives the following example command block for a make directory command:

cmd mkdir root/base
path/path/to/create
env S:VAR:value
username name
password pass The command agent can read the command block tag lines and determine the command that is being issued (i.e., the "mkdir" command) to initiate the appropriate process to handle that command. The command agent can also perform user authentication. In the windows environment, for example, the command agent can create an impersonation token, activate the impersonation token and load a user profile. In the UNIX environment, the command agent can start a PAM session, authenticate a PAM user and establish PAM credentials. The client agent can further perform environmental commands, in this case setting VAR=value and can perform recursive expansion of variables.

The command agent can further set the working path by adjusting the path supplied by the command issuing to program to the underlying platform (e.g., by adding one or more "/" to the path name for Unix or Windows or, as another example, ">" for VOS). The pathname set by the command agent can be based on the path supplied in the command block and the pathname format required by the underlying program. The command agent can then create the specified directory, in this case "path/to/create/" in the working path "/base". This can be done for example, by tokenizing the supplied directory into components (e.g., into "path", "to" and "create"), performing variable expansion, creating a component and appending the component to the working path and repeating. Assuming the working directory is set to base, the command agent can issue the following example commands to the underlying UNIX or Windows shell to create the directory:

mkdir \path
chdir \path
mkdir \to
chdir \to
mkdir \create

Or, if command extensions are enabled in the Windows platform, the command agent can issue mkdir \path\to\create command to the Windows shell to create the "\create" directory and the intermediate directories with one command.

According to one embodiment of the present invention, the command agent can receive results of an operation from the underlying shell and build a response block indicating the results. The command agent can also perform authentication shutdown by, for example, releasing the impersonation token in the windows environment or shutting the PAM session in the UNIX environment.

As can be understood from the foregoing, the generic command structure and result blocks used by the command agents allows command definition and response data to be formatted in a consistent manner allowing the creation of greatly simplified distributed applications. Additionally, because the command agent can implement authentication, the command agent can hide the platform specific nature of authentication, environment definition, and command execution.

Embodiments of the present invention provide advantages over prior art systems and methods. One advantage is that the generic command structure allows a user to specify a working environment and initial directory that can be used across various platforms. Another advantage is that the generic command structure allows authentication information to be specified. Because a command can be authenticated based on passwords, tokens or other attributes, it is less likely that an unintended user can gain access to a system's shell. As additional advantages, embodiments of the present invention provide consistently formatted result data, consistently formatted status code data and well defined error messages.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method of command processing comprising:

generating a first platform specific command and formatting the first platform specific command according to a generic command structure to generate a generic command, wherein the generic command structure includes a command block;

establishing a connection between a command issuing computer and a command processing computer;

launching a command agent at the command processing computer, wherein the command agent translates the generic command into a second platform specific command; and creating a working directory on the command processing computer based on a working directory path supplied in the command block, wherein creating the working directory includes issuing one or more commands on the remote computer to create the working directory and wherein creating the working directory is based upon, at least in part, a pathname format associated with the second platform specific format;

wherein the command block includes a header, environmental settings that can be used by a shell to define particular settings at the shell, authentication information, and a footer, one of the header and the footer included in the command block include user defined information, and the authentication information included in the command block includes an account/user identification and an account/user password.

2. The method of claim 1, further comprising:
launching a shell;
passing the second platform specific command from the command agent to the shell; and
processing the second platform specific command with a shell process.

3. The method of claim 1, further comprising authenticating the generic command.

4. The method of claim 1, further comprising:
generating a set of environmental commands according to the generic command structure; and
translating the set of environmental commands into a platform specific set of environmental commands.

5. The method of claim 1 wherein the command string of the command block is a string of data representing a command to be executed.

6. A computer program product comprising one or more non-transitory computer readable media storing a set of computer instructions that are executable by one or more computer processors, wherein the set of computer instructions comprise instructions executable to:
format a command according to a generic command structure from a command in a first platform specific format, wherein formatting the command includes generating a command block;
send the command formatted according to the generic command structure to a remote computer;
translate the command formatted according to the generic command structure to a second platform specific format at the remote computer; and
create a working directory on the remote computer based on a working directory path supplied in the command block, wherein creating the working directory includes issuing one or more commands on the remote computer to create the working directory and wherein creating the working directory is based upon, at least in part, a pathname format associated with the second platform specific format;
wherein the command block includes a header, environmental settings that can be used by a shell to define particular settings at the shell, authentication information, and a footer, one of the header and the footer included in the command block include user defined information, and the authentication information included in the command block includes an account/user identification and an account/user password.

7. The computer program product of claim 6, wherein the command block further comprises:
the command in the first platform specific format formatted according to the generic command structure; and
authentication information.

8. The computer program product of claim 6, wherein the set of computer instructions further comprise instructions executable to:
generate a result block; and
generate a data block.

9. A system for distributed processing comprising:
a command issuing computer further comprising:
a command issuing computer processor;
a command issuing computer readable medium;
a command issuing program stored on the command issuing computer readable and executable by the command issuing computer processor to:
generate a command according to a first platform specific format;
format the command according to the first platform specific format according to a generic command structure to generate a generic command, wherein the generic command structure includes a command block;
transmit the generic command to command processing computers; and
create a working directory on the command processing computers based on a working directory path supplied in the command block, wherein creating the working directory includes issuing one or more commands on the remote computer to create the working directory and wherein creating the working directory is based upon, at least in part, a pathname format associated with the second platform specific format;
a first command processing computer connected to the command issuing computer comprising:
a first command processing computer processor;
a first command processing computer readable medium;
a first command agent stored on the first command processing computer readable medium, wherein the first command agent is executable to:
receive the generic command; and
generate a second platform specific command based on the received generic command;
a second command processing computer connected to the command issuing computer comprising:
a second command processing computer processor;
a second command processing computer readable medium;
a second command agent stored on the second command processing computer readable medium, wherein the second command agent is executable to:
receive the generic command; and
generate a third platform specific command based on the received generic command;
wherein the command block includes a header, environmental settings that can be used by a shell to define particular settings at the shell, authentication information, and a footer, one of the header and the footer included in the command block include user defined information, and the authentication information included in the command block includes an account/user identification and an account/user password.

10. The system of claim 9, wherein the second platform specific command and the third platform specific command are formatted according to different platforms.

11. The system of claim 10, wherein the second platform specific command is formatted for a Unix based platform and the third platform specific command is formatted for a Windows operating system based platform.

12. The system of claim 9, wherein:
the first command agent is further executable to launch a first shell and the second command agent is further executable to launch a second shell.

13. The system of claim 12, wherein the first command agent is further executable to issue the second platform specific command to the first shell and the second command agent is executable to issue the third platform specific command to the second shell.

14. The system of claim 9, wherein:
the command issuing program is further executable to send a set of environmental variables to the first command agent and second command agent according to the generic command structure and wherein:
the first command agent is further executable to generate a second set of platform specific environmental commands; and the second command agent is further executable to generate a third set of platform specific environmental commands.

15. The system of claim 9, wherein the first command agent and second command agent are further executable to authenticate the command.

16. The system of claim 9, wherein the first and second command agents are further executable to return data and errors to the command issuing program.

* * * * *